(12) United States Patent
Kouketsu et al.

(10) Patent No.: US 9,022,366 B2
(45) Date of Patent: May 5, 2015

(54) LIQUID CONTROL DEVICE AND MESH-LIKE BODY ASSEMBLY APPLIED THERETO

(71) Applicant: CKD Corporation, Komaki-shi, Aichi (JP)

(72) Inventors: Masayuki Kouketsu, Komaki (JP); Hiroshi Itafuji, Komaki (JP); Masayo Okada, Komaki (JP)

(73) Assignee: CKD Corporation, Komaki-shi, Aichi (JP)

( * ) Notice: Subject to any disclaimer, the term of this patent is extended or adjusted under 35 U.S.C. 154(b) by 186 days.

(21) Appl. No.: 13/940,102

(22) Filed: Jul. 11, 2013

(65) Prior Publication Data
US 2014/0015151 A1  Jan. 16, 2014

(30) Foreign Application Priority Data
Jul. 12, 2012 (JP) ................. 2012-156094

(51) Int. Cl.
*B01F 3/04* (2006.01)
*B05B 9/03* (2006.01)
*B01D 1/22* (2006.01)

(52) U.S. Cl.
CPC ... *B01F 3/04* (2013.01); *B05B 9/03* (2013.01); *B01D 1/22* (2013.01); *B01D 1/221* (2013.01)

(58) Field of Classification Search
CPC .................................... B01F 3/04; B05B 9/03
USPC ....................... 261/100, 107, 152
See application file for complete search history.

(56) References Cited

U.S. PATENT DOCUMENTS

| 6,224,681 B1 | 5/2001 | Sivaramakrishnan et al. |
| 2005/0006609 A1 | 1/2005 | Fukano |
| 2007/0101940 A1 | 5/2007 | Iizuka |
| 2012/0180724 A1 | 7/2012 | Kouketsu et al. |
| 2013/0193230 A1 | 8/2013 | Kouketsu et al. |

FOREIGN PATENT DOCUMENTS

| GB | 1439603 | 6/1976 |
| JP | 49-52175 | 5/1974 |
| JP | 5-156448 | 6/1993 |
| JP | 6-132209 | 5/1994 |
| JP | 6-232035 | 8/1994 |
| JP | 7-47201 | 2/1995 |
| JP | 7-155584 | 6/1995 |
| JP | 9-152287 | 6/1997 |
| JP | 9-186107 | 7/1997 |
| JP | 10-337464 | 12/1998 |
| JP | 2001200239 A * | 7/2001 |

(Continued)

*Primary Examiner* — Robert A Hopkins
(74) *Attorney, Agent, or Firm* — Beyer Law Group LLP

(57) ABSTRACT

A liquid vaporizer includes a first housing having a liquid-supplied surface to which a chemical solution is supplied, a heater, a mesh, a first holder and a second holder attached to the outer edge portions of the mesh, the outer edge portions opposing each other in a direction of spreading of the mesh, first cover bolts, stems supported by the first housing so as to be movable along a specific direction inclined with respect to the liquid-supplied surface, second cover bolts, coil springs biasing the stems along the specific direction and bring the mesh into intimate contact with the liquid-supplied surface, and a lid member covering the mesh from a side of the liquid-supplied surface to seal a space around the liquid-supplied surface with the first housing.

19 Claims, 14 Drawing Sheets

(56) References Cited

FOREIGN PATENT DOCUMENTS

| | | | |
|---|---|---|---|
| JP | 2001-295050 | | 10/2001 |
| JP | 2002110659 A | * | 4/2002 |
| JP | 2002-228117 | | 8/2002 |
| JP | 2004-115920 | | 4/2004 |
| JP | 2005-57193 | | 3/2005 |
| JP | 2006-352001 | | 12/2006 |
| JP | 2008-263244 | | 10/2008 |
| JP | 2009-38047 | | 2/2009 |
| JP | 2009-194246 | | 8/2009 |
| JP | 4673449 | | 1/2011 |
| WO | WO 2004/092622 | | 10/2004 |

* cited by examiner

LIQUID CONTROL DEVICE AND MESH-LIKE BODY ASSEMBLY APPLIED THERETO

CROSS-REFERENCE TO RELATED APPLICATIONS

The present application claims priority based on Japan Patent Application No. 2012-156094 filled on Jul. 12, 2012, and entire contents of that application are incorporated by reference in this specification.

BACKGROUND OF THE INVENTION

1. Field of the Invention

The present invention relates to a liquid control device for controlling spreading and vaporization of a liquid in contact with a surface, and a mesh-like body assembly applied to the liquid control device.

2. Description of the Related Art

Among the liquid control devices of this type, there is the liquid control device in which a mesh (a mesh-like body) is placed on the upper surface of a heat storage plate to form minute projections and depressions on the heat storage plate (see, e.g., Japanese Patent Gazette No. 4673449). According to the liquid control device described in Japanese Patent Gazette No. 4673449, a liquid supplied between the upper surface (a liquid-supplied surface) of the heat storage plate (a main body) and the mesh spreads by interfacial tension, and hence it is possible to supply the liquid in the large area of the upper surface of the heat storage plate. Subsequently, the heat storage plate is heated by a heater, and the liquid on the upper surface of the heat storage plate is vaporized.

Incidentally, in the liquid control device described in Japanese Patent Gazette No. 4673449, the mesh is pushed against the upper surface of the heat storage plate by the tips of a plurality of pins disposed at a predetermined pitch. Accordingly, the degree of intimate contact of the mesh with the upper surface of the heat storage plate differs between the portion of the mesh that is pushed by the tip of the pin and the portion of the mesh that is not pushed by the tip. As a result, the liquid spreading over the upper surface of the heat storage plate may become uneven and the vaporization of the liquid may become unstable.

SUMMARY OF THE INVENTION

The present invention has been achieved in view of the above circumstances, and a primary object thereof is to provide the liquid control device capable of bringing the mesh-like body into intimate contact with the liquid-supplied surface uniformly, and also improving workability in attaching and detaching the mesh-like body to and from the main body, and the mesh-like body assembly applied to the liquid control device.

The present invention has adopted the following means in order to solve the above problem.

A first means is a liquid control device for controlling spreading and vaporization of a liquid, including a main body having a liquid-supplied surface to which the liquid is supplied, a heater configured to heat the liquid-supplied surface, a mesh-like body woven in a mesh pattern, a first holder and a second holder respectively attached to outer edge portions of the mesh-like body. The outer edge portions oppose each other in a direction of spreading of the mesh-like body. The liquid control device further includes a first fixing member fixing the first holder to the main body from a side of the liquid-supplied surface, a moving member supported by the main body so as to be movable along a specific direction inclined with respect to the liquid-supplied surface, a second fixing member fixing the second holder to the moving member from the side of the liquid-supplied surface, a biasing member biasing the moving member along the specific direction to bring the mesh-like body into intimate contact with the liquid-supplied surface, and a lid member covering the mesh-like body from the side of the liquid-supplied surface to seal a space around the liquid-supplied surface with the main body.

According to the above structure, the first holder and the second holder are attached to the outer edge portions of the mesh-like body that oppose each other in the direction of spreading of the mesh-like body woven in a mesh pattern. The first holder is fixed to the main body by the first fixing member, and the second holder is fixed to the moving member by the second fixing member. The moving member is supported by the main body so as to be movable along the specific direction inclined with respect to the liquid-supplied surface. The moving member is biased by the biasing member along the specific direction, and the mesh-like body coupled to the moving member via the second holder is in intimate contact with the liquid-supplied surface.

Accordingly, it is possible to maintain a state where tension acts on the mesh-like body to thereby prevent the looseness of the mesh-like body. Further, the tension acts on the outer edge potions of the mesh-like body that oppose each other via the first holder and the second holder, and hence it is possible to bring the mesh-like body into intimate contact with the liquid-supplied surface uniformly. Consequently, it is possible to uniformly spread the liquid supplied to the liquid-supplied surface along the liquid-supplied surface by interfacial tension at an interface between the liquid-supplied surface and the mesh-like body. As a result, it is possible to stably vaporize the liquid on the liquid-supplied surface when the liquid-supplied surface is heated by the heater.

Herein, the first fixing member fixes the first holder to the main body from the side of the liquid-supplied surface, and the second fixing member fixes the second holder to the moving member from the side of the liquid-supplied surface. In addition, the mesh-like body is covered with the lid member from the side of the liquid-supplied surface, and the space around the liquid-supplied surface is sealed by the main body and the lid member. Accordingly, it is possible to perform fixing of the mesh-like body to the main body, bringing of the mesh-like body into intimate contact with the liquid-supplied surface, and sealing of the space around the liquid-supplied surface from the side of the liquid-supplied surface. Consequently, it is possible to improve workability in attaching and detaching the mesh-like body to and from the main body. Further, it is possible to easily clean the liquid-supplied surface with the mesh-like body being detached.

Specifically, as in a second means, it is possible to adopt a structure in which the biasing member is a coil spring. According to such a structure, it is possible to stably bias the moving member, and hence it is possible to properly adjust a force for bringing the mesh-like body into intimate contact with the liquid-supplied surface, and by extension stabilize performance in vaporizing the liquid. Further, even when the mesh-like body is stretched due to the use, it is possible to absorb the stretch using the coil spring, and hence it is possible to prevent the intimate contact between the liquid-supplied surface and the mesh-like body from being weakened.

In a third means, the main body is formed with a curved surface gradually inclined from the liquid-supplied surface toward the specific direction, and the mesh-like body is placed over the curved surface between the liquid-supplied surface and the moving member.

According to the above structure, the main body is formed with the curved surface gradually inclined from the liquid-supplied surface toward the specific direction inclined with respect to the liquid-supplied surface. The mesh-like body is placed over the curved surface between the liquid-supplied surface and the moving member, and the biasing member biases the moving member along the specific direction. Accordingly, the mesh-like body coupled to the moving member via the second holder is smoothly pulled along the curved surface in the specific direction. Accordingly, it is possible to bring the mesh-like body into intimate contact with the liquid-supplied surface stably while fixing the second holder to the moving member using the second fixing member from the side toward the liquid-supplied surface.

In a fourth means, the specific direction is a direction perpendicular to the liquid-supplied surface.

According to the above structure, it is possible to efficiently provide the disposition space of the moving member in the main body to prevent an increase in the size of the main body.

In a fifth means, the mesh-like body is formed in a rectangular shape, the first holder and the second holder are respectively attached to the outer edge portions of the mesh-like body over entire lengths of the outer edge portions, the first fixing member is provided at each of a plurality of portions of the first holder, and the second fixing member is provided at each of a plurality of portions of the second holder.

According to the above structure, the mesh-like body is formed in the rectangular shape, and the first holder and the second holder are respectively attached to the outer edge portions of the rectangular mesh-like body that oppose each other. Further, the first holder and the second holder are attached to the outer edge portions over the entire lengths of the outer edge portions. In addition, since the first fixing member is provided at each of the plurality of portions of the first holder, it is possible to fix the plurality of portions of the first holder to the main body to prevent the rotation of the first holder, and fix one side of the mesh-like body over the entire length of the side via the first holder. Further, since the second fixing member is provided at each of the plurality of portions of the second holder, it is possible to fix the plurality of portions of the second holder to the moving member to prevent the rotation of the second holder, and pull one side of the mesh-like body over the entire length of the side via the second holder. Consequently, it is possible to bring the entire mesh-like body into intimate contact with the liquid-supplied surface uniformly.

In a sixth means, the first fixing member is provided at each of both end portions of the first holder, and the second fixing member is provided at each of both end portions of the second holder.

According to the above structure, since the first fixing member is provided at each of both end portions of the first holder, it is possible to fix both end portions of the first holder to the main body and stabilize them, and fix one side of the mesh-like body over the entire length of the side via the first holder more reliably. In addition, since the second fixing member is provided at each of both end portions of the second holder, it is possible to fix both end portions of the second holder to the moving member and stabilize them, and pull one side of the mesh-like body over the entire length of the side via the second holder more reliably.

In a seventh means, the first fixing member fixes the first holder to the main body from an upper side, the second fixing member fixes the second holder to the moving member from the upper side, and the lid member covers the mesh-like body from the upper side.

According to the above structure, it is possible to perform fixing of the mesh-like body to the main body, bringing of the mesh-like body into intimate contact with the liquid-supplied surface, and sealing of the space around the liquid-supplied surface from the upper side. Consequently, it is possible to further improve the workability in attaching and detaching the mesh-like body to and from the main body.

An eighth means is a mesh-like body assembly applied to a liquid control device for controlling spreading and vaporization of a liquid, including a mesh-like body woven in a mesh pattern and formed in a rectangular shape, a first holder and a second holder respectively attached to outer edge portions of the mesh-like body that oppose each other over entire lengths of the outer edge portions, a first fixing member attached to each of a plurality of portions of the first holder from a specific side and used to fix the first holder to the liquid control device, and a second fixing member attached to each of a plurality of portions of the second holder from the specific side and used to fix the second holder to the liquid control device.

According to the above structure, the mesh-like body assembly can be treated as one element including the mesh-like body, the first holder, the second holder, the first fixing member, and the second fixing member, and hence it is possible to facilitate the assembly of the liquid control device. In a case where the mesh-like body assembly of the eighth means is applied to the liquid control device of the first means, it is possible to achieve the same functions and effects as those of the first means and the fourth means.

A ninth means is the mesh-like body assembly further including a first holding member formed in a circular tube shape and disposed along the first holder, and a second holding member formed in a circular tube shape and disposed along the second holder, wherein the outer edge portions of the mesh-like body are respectively held between a part of the first holder and an outer peripheral surface of the first holding member, and between a part of the second holder and an outer peripheral surface of the second holding member.

According to the above structure, the first holding member in a circular tube shape is disposed along the first holder, and the second holding member in a circular tube shape is disposed along the second holder. The outer edge portions of the mesh-like body that oppose each other are respectively held between a part of the first holder and the outer peripheral surface of the first holding member, and between a part of the second holder and the outer peripheral surface of the second holding member. Accordingly, it is possible to fix the mesh-like body using curved surfaces instead of points or acute-angled portions, and prevent damage to the mesh-like body in the portion where the holder is attached to the mesh-like body. Further, since the first holding member and the second holding member are in a circular tube shape, i.e., are hollow, it is possible to resiliently support the mesh-like body. Consequently, it is possible to prevent the mesh-like body from being detached from the holder.

In a tenth means, each of the first fixing member and the second fixing member is a cover bolt including a head portion, a screw portion, and a shaft portion that connects the head portion and the screw portion, a first screw hole is formed at each of a plurality of portions of the first holder, a second screw hole is formed at each of a plurality of portions of the second holder, the shaft portion of the first fixing member is inserted into the first screw hole of the first holder, and the shaft portion of the second fixing member is inserted into the second screw hole of the second holder.

According to the above structure, each of the first fixing member and the second fixing member is constituted by the cover bolt. In addition, the shaft portion of the first fixing member is inserted into the first screw hole of the first holder, and the shaft portion of the second fixing member is inserted into the second screw hole of the second holder. Accordingly, when the mesh-like body assembly is assembled to the liquid control device, it is possible to prevent the first fixing member and the second fixing member from being detached from the mesh-like body assembly. As a result, it is possible to prevent the first fixing member and the second fixing member from getting lost in the internal portion of the liquid control device.

An eleventh means is the mesh-like body assembly further including a transport member formed with engaging portions engageable with the cover bolts at positions corresponding to the cover bolts in a state where the mesh-like body is spread, wherein the cover bolts are engaged with the engaging portions of the transport member.

According to the above structure, the transport member is formed with the engaging portions engageable with the cover bolts at the positions corresponding to the cover bolts in the state where the mesh-like body is spread. In addition, since the cover bolts are engaged with the engaging portions of the transport member, it is possible to maintain the state where the mesh-like body is spread. Consequently, it is possible to prevent the mesh-like body from being bent or wrinkled during the transport or the like of the mesh-like body assembly.

A twelfth means is the mesh-like body assembly further including a guiding member woven in a mesh pattern and in contact with the mesh-like body.

According to the above structure, in the portion of the guiding member in contact with the mesh-like body, it is possible to spread the liquid by interfacial tension even between the mesh-like body and the guiding member. Accordingly, the spreading of the liquid can be facilitated more in the portion provided with the guiding member than in the other portions. As a result, it is possible to spread the liquid preferentially in a desired direction by adjusting the disposition of the guiding member. Further, since the guiding member is formed by being woven in a mesh pattern, it is possible to facilitate the vaporization of the liquid via the guiding member as compared with a case where the guiding member is formed in a plate-like shape or a film-like shape.

A thirteenth means is the mesh-like body assembly further including a blocking member formed in a plate-like shape or a film-like shape and covering a part of the guiding member.

According to the above structure, in the portion of the blocking member formed in the plate-like shape or the film-like shape, it is possible to prevent the liquid from passing through the blocking member. Accordingly, it is possible to prevent the supplied liquid from passing through the mesh-like body and the guiding member and jetting out by disposing the blocking member at a position where the liquid is supplied.

The above and other objects, features, and advantages of the present invention will be apparent from the following description when taken in conjunction with the accompanying drawings which illustrate preferred embodiments of the present invention by way of example.

DESCRIPTION OF THE PREFERRED EMBODIMENTS

Hereinbelow, an embodiment will be described with reference to the drawings. The present embodiment is embodied as a liquid vaporizer that vaporizes a chemical solution and then discharges the vaporized chemical solution while mixing it with inert gas.

First, the basic structure of the liquid vaporizer will be described.

Figure 1:
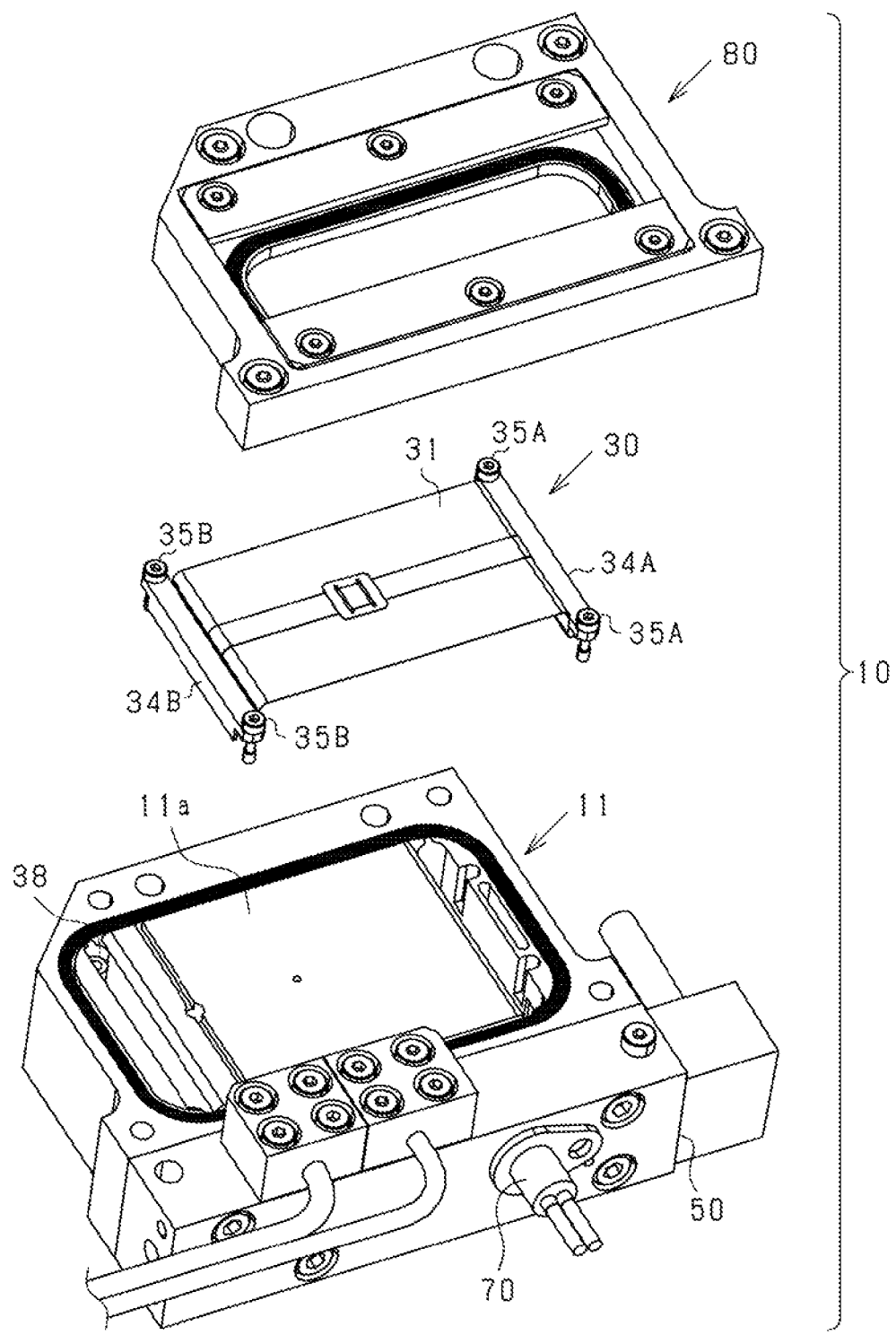
FIG. 1 is an exploded perspective view of a liquid vaporizer.

As shown in FIG. 1, a liquid vaporizer 10 (a liquid control device) includes a first housing 11, a second housing 50, a mesh assembly 30, a heater 70, and a lid member 80. The first housing 11 (a main body) is formed in a rectangular parallelepiped shape. A part of the upper surface of the first housing 11 serves as a liquid-supplied surface 11a to which a chemical solution is supplied. To the first housing 11, the mesh assembly 30 and the second housing 50 are assembled. The lid member 80 is assembled to the first housing 11 so as to cover the mesh assembly 30. With this, the space around the liquid-supplied surface 11a is sealed by the first housing 11 and the lid member 80.

Figure 2:
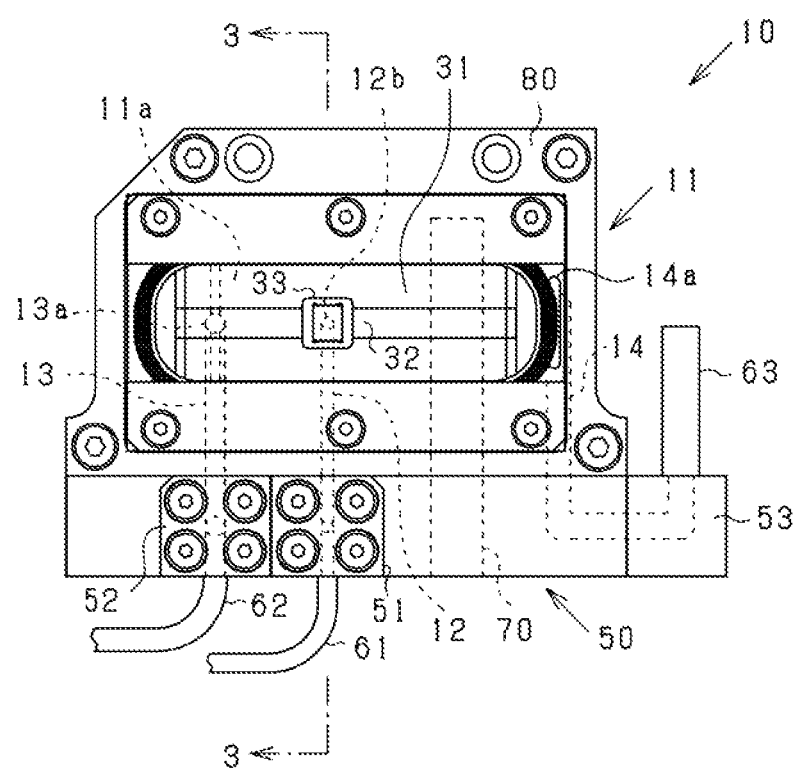
FIG. 2 is a plan view of the liquid vaporizer.
Figure 3:
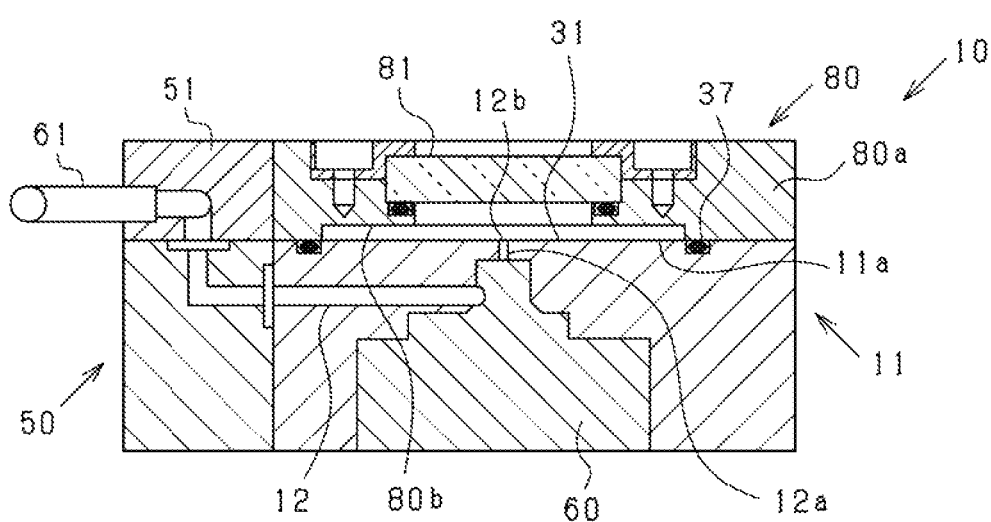
FIG. 3 is a cross-sectional view taken along the line 3-3 of FIG. 2.

FIG. 2 is a plan view of the liquid vaporizer 10, while FIG. 3 is a cross-sectional view taken along the line 3-3 of FIG. 2. As shown in the drawings, liquid flow paths 12 and 12a are formed inside the first housing 11. The liquid flow path 12a is opened in the liquid-supplied surface 11a, and the opening severs as a supply opening 12b of the chemical solution. A valve mechanism 60 is provided between the liquid flow paths 12 and 12a. A liquid pipe 61 is connected to the liquid flow path 12 through a passage formed inside a liquid introducing member 51 and the second housing 50. Note that each of the first housing 11, the liquid introducing member 51, and the second housing 50 is formed of a material having relatively high corrosion resistance to the chemical solution and relatively high wettability of the chemical solution, e.g., a stainless material or an aluminum material in a case where the chemical solution is, e.g., a hydrophobizing solution.

Gas flow paths 13 and 14 are formed inside the first housing 11. The gas flow path 13 is opened in the liquid-supplied surface 11a, and the opening serves as an introduction opening 13a of nitrogen (inert gas). A gas pipe 62 is connected to the gas flow path 13 through a passage formed inside a gas introducing member 52 and the second housing 50. In addition, the gas flow path 14 is opened in the liquid-supplied surface 11a, and the opening serves as a discharge opening 14a of nitrogen. A gas pipe 63 is connected to the gas flow path 14 through a passage formed inside a gas discharging member 53 and the second housing 50.

Figure 4:
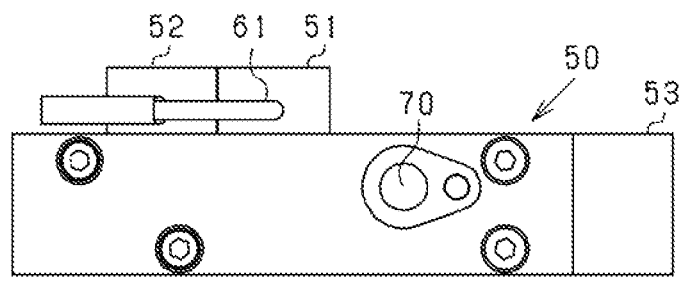
FIG. 4 is a side view of the liquid vaporizer.

FIG. 4 is a side view of the liquid vaporizer 10. As shown in FIGS. 2 and 4, a heater 70 is inserted into the first housing 11 through a through hole formed inside the second housing 50. The heater 70 is disposed between the supply opening 12b of the chemical solution and the discharge opening 14a of nitrogen in the direction of spreading of the liquid-supplied surface 11a. The heater 70 is disposed at a position close to the liquid-supplied surface 11a in a vertical direction (a thickness direction) of the first housing 11.

A mesh 31 woven in a mesh pattern is brought into intimate contact with the liquid-supplied surface 11a. The roughness of meshes of the mesh 31 (a mesh-like body) is a roughness that facilitates the formation of a film by the chemical solution at the openings of the mesh 31 and, e.g., 100 mesh with which 100 openings are present per square inch. Specifically, the wire diameter of the mesh 31 is 0.1 mm, and the inter-wire distance thereof is 0.15 mm. It is desirable to properly set the roughness of the mesh 31 according to the wettability of the chemical solution to the mesh 31, the wettability of the chemical solution to the first housing 11, the viscosity of the chemical solution or the like. The mesh 31 is formed of a material having relatively high corrosion resistance to the chemical solution and relatively high wettability of the chemical solution. For example, the mesh 31 is formed of a stainless material in a case where the chemical solution is, e.g., a hydrophobizing solution.

A mesh band 32 woven in a mesh pattern is brought into intimate contact with the upper surface of the mesh 31. The mesh band 32 extends toward the discharge opening 14a from the introduction opening 13a to cover the supply opening 12b. The roughness of meshes of the mesh band 32 (a guiding member) is also set to 100 mesh. It is desirable to properly set the roughness of the mesh band 32 according to the wettability of the chemical solution to the mesh band 32, the wettability of the chemical solution to the first housing 11, the viscosity of the chemical solution or the like. The mesh band 32 is also formed of the stainless material in the case where the chemical solution is, e.g., the hydrophobizing solution.

A blocking member 33 is attached to the portion of the mesh band 32 that covers the supply opening 12b. The blocking member 33 is formed in a plate-like shape, and is formed of the stainless material in the case where the chemical solution is, e.g., the hydrophobizing solution. The blocking member 33 is formed with two through holes, and the mesh band 32 inserted into one of the through holes is inserted into the other through hole.

As shown in FIGS. 2 and 3, the lid member 80 is assembled to the first housing 11 so as to cover the mesh 31 from the upper side (the side toward the liquid-supplied surface 11a). The lid member 80 includes a main body 80a and a window member 81 formed of glass. The window member 81 extends along the direction of extension of the mesh band 32, i.e., the direction from the introduction opening 13a to the discharge opening 14a. In the direction of spreading of the liquid-supplied surface 11a, the longitudinal length of the window member 81 is longer than the distance between the introduction opening 13a and the discharge opening 14a. The lateral length of the window member 81 is longer than the width of the mesh band 32. The space between the main body 80a and the window member 81 is sealed by an O ring (a sealing member).

The lower surface of the main body 80a is formed with a concave portion 80b. The concave portion 80b is formed at a position opposing the liquid-supplied surface 11a. With the concave portion 80b, a space is formed between the liquid-supplied surface 11a and the main body 80a, i.e., around the liquid-supplied surface 11a. The space between the first housing 11 and the lid member 80 is sealed by an O ring 37 (a sealing member). With this, the space around the liquid-supplied surface 11a is sealed.

Next, the basic operation of the liquid vaporizer 10 having the above structure will be described.

The chemical solution is supplied to the liquid pipe 61 by a pump that is not shown. The chemical solution supplied to the liquid pipe 61 is supplied to the liquid flow path 12 through the passage formed inside the liquid introducing member 51 and the second housing 50. Subsequently, the supply of the chemical solution to the liquid flow path 12a from the liquid flow path 12 is controlled by the valve mechanism 60. The chemical solution supplied to the liquid flow path 12a is supplied to the liquid-supplied surface 11a from the supply opening 12b.

Nitrogen is supplied to the gas pipe 62 from a nitrogen supply source that is not shown. Nitrogen supplied to the gas pipe 62 is supplied to the gas flow path 13 through the passage formed inside the gas introducing member 52 and the second housing 50. Nitrogen supplied to the gas flow path 13 is supplied to the space around the liquid-supplied surface 11a from the introduction opening 13a.

The chemical solution supplied from the supply opening 12b impinges on the plate-like blocking member 33, and the chemical solution is prevented from passing through the blocking member 33. Accordingly, the chemical solution supplied to the liquid-supplied surface 11a from the supply opening 12b is prevented from passing through the mesh 31 and the mesh band 32 and jetting out.

A large number of fine interfaces are formed between the liquid-supplied surface 11a and the wire material of the mesh 31. Consequently, the chemical solution supplied to the liquid-supplied surface 11a spreads along the liquid-supplied surface 11a by interfacial tension at a large number of the fine interfaces (a capillary phenomenon). Further, the chemical solution has the wettability to the liquid-supplied surface 11a and the wire material of the mesh 31, and hence the spreading of the chemical solution along the liquid-supplied surface 11a is facilitated.

In the portion where the mesh band 32 is in intimate contact with the mesh 31, the chemical solution spreads also between the mesh 31 and the mesh band 32 by the interfacial tension. Accordingly, the spreading of the chemical solution is more facilitated in the portion provided with the mesh band 32 than in the other portions. As a result, the chemical solution supplied to the liquid-supplied surface 11a from the supply opening 12b spreads preferentially toward the introduction opening 13a and the discharge opening 14a along the mesh band 32. Subsequently, in the direction of spreading of the liquid-supplied surface 11a, the chemical solution is caused to spread also in a direction perpendicular to the mesh band 32 by the mesh 31, and the chemical solution thereby spreads over the entire liquid-supplied surface 11a.

At this point, an operator is able to observe the state of spreading of the chemical solution on the liquid-supplied surface 11a through the window member 81. The window member 81 extends along the direction of extension of the mesh band 32, i.e., the direction from the introduction opening 13a to the discharge opening 14a, and hence it is possible to observe the state of the preferential spreading of the chemical solution along the mesh 31. Further, in the direction of spreading of the liquid-supplied surface 11a, the longitudinal length of the window member 81 is longer than the distance between the introduction opening 13a and the discharge opening 14a, and the lateral length of the window member 81 is longer than the width of the mesh band 32. Accordingly, the operator is able to sufficiently observe the state of spreading of the chemical solution over the entire liquid-supplied surface 11a.

The liquid-supplied surface 11a is heated by the heater 70, and the chemical solution spread on the liquid-supplied surface 11a is thereby vaporized efficiently. Since the mesh band 32 is formed by being woven in a mesh pattern, the vaporization of the liquid via the mesh band 32 is facilitated as compared with a case where the mesh band 32 is formed in a plate-like shape or a film-like shape. The vaporized chemical solution is discharged from the discharge opening 14a together with nitrogen (carrier gas) introduced into the space around the liquid-supplied surface 11a from the introduction opening 13a. Subsequently, mixed gas of the vapor of the chemical solution and nitrogen is discharged from the gas pipe 63 through the gas flow path 14 and the passage formed inside the second housing 50 and the gas discharging member 53. Note that the mixed gas is sent to a device that performs a treatment using the mixed gas through the gas pipe 63.

Figure 5:
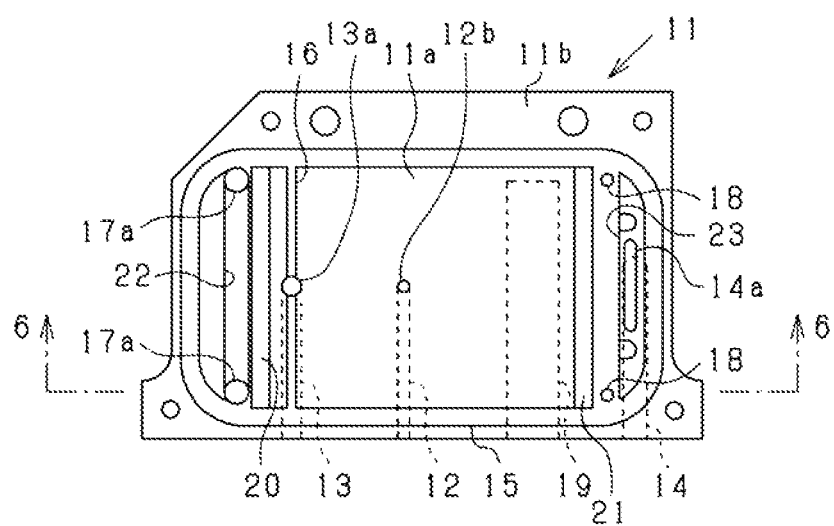
FIG. 5 is a plan view of a first housing.
Figure 6:
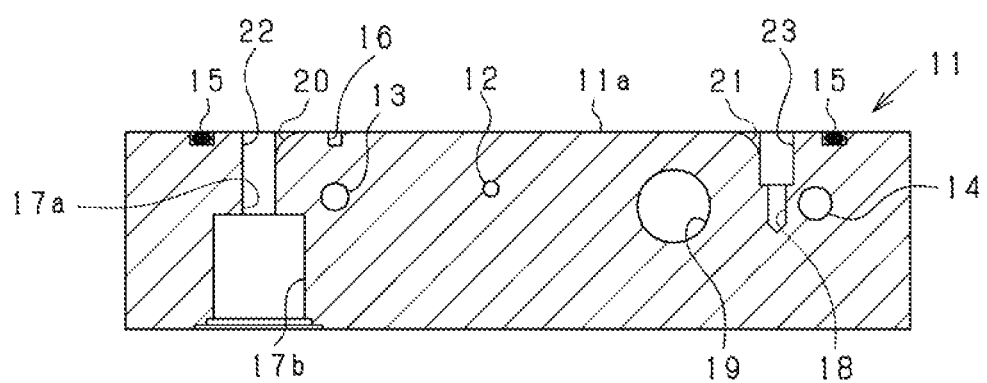
FIG. 6 is a cross-sectional view taken along the line 6-6 of FIG. 5.

Next, with reference to FIGS. 5 and 6, the structure of the first housing 11 will be described in detail. FIG. 5 is a plan view of the first housing 11, while FIG. 6 is a cross-section view taken along the line 6-6 of FIG. 5.

The first housing 11 is formed in the rectangular parallelepiped shape, and a part of the upper surface thereof serves as the above liquid-supplied surface 11a. That is, an upper surface 11b of the first housing 11 is flush with the liquid-supplied surface 11a. The liquid-supplied surface 11a is formed into a smooth surface. The upper surface of the first housing 11 is formed with a square annular groove 15 that separates the liquid-supplied surface 11a from the upper surface 11b (the other portion of the upper surface).

As described above, the liquid flow path 12, and the gas flow paths 13 and 14 are formed inside the first housing 11. In addition, a hole 19 into which the heater 70 is inserted is also formed inside the first housing 11. Further, the supply opening 12b, the introduction opening 13a, and the discharge opening 14a are opened in the liquid-supplied surface 11a. Furthermore, the liquid-supplied surface 11a is formed with a groove 16 that extends along the lateral direction of the liquid-supplied surface 11a through the introduction opening 13a.

The upper surface of the first housing 11 is formed with grooves 22 and 23 that extend along the lateral direction of the liquid-supplied surface 11a. In the direction of spreading of the liquid-supplied surface 11a, the groove 22 is formed on the side opposite to the side of the supply opening 12b relative to the introduction opening 13a, and the groove 23 is formed on the side opposite to the side of the introduction opening 13a relative to the supply opening 12b (on the side of the hole 19). The first housing 11 is formed with curved surfaces 20 and 21 that smoothly connect the liquid-supplied surface 11a to side surfaces of the grooves 22 and 23 (a direction inclined with respect to the liquid-supplied surface 11a). The curved surfaces 20 and 21 are gradually inclined from the liquid-supplied surface 11a toward a direction perpendicular to the liquid-supplied surface 11a. That is, the entire surface including the liquid-supplied surface 11a and the curved surfaces 20 and 21 is formed into a smooth surface.

Holes 17a each having a circular cross section are formed on both end portions of the bottom surface of the groove 22. Holes 17b each having the circular cross section that communicate with the holes 17a are formed in the lower surface of the first housing 11. The diameter of the hole 17b is larger than that of the hole 17a. In addition, screw holes 18 are formed in both end portions of the bottom surface of the groove 23.

Figure 7:
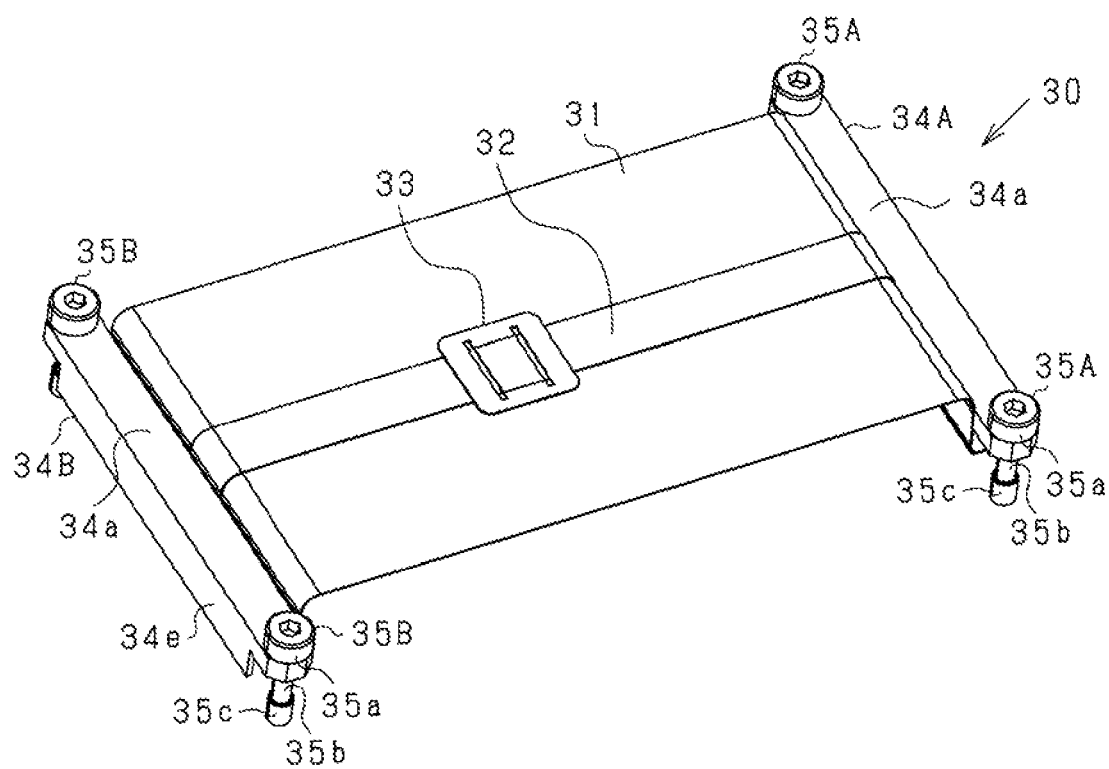
FIG. 7 is a perspective view of a mesh assembly.
Figure 8:
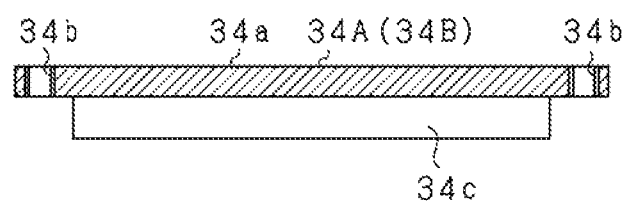
FIG. 8 is a cross-sectional view of a holder.
Figure 9:
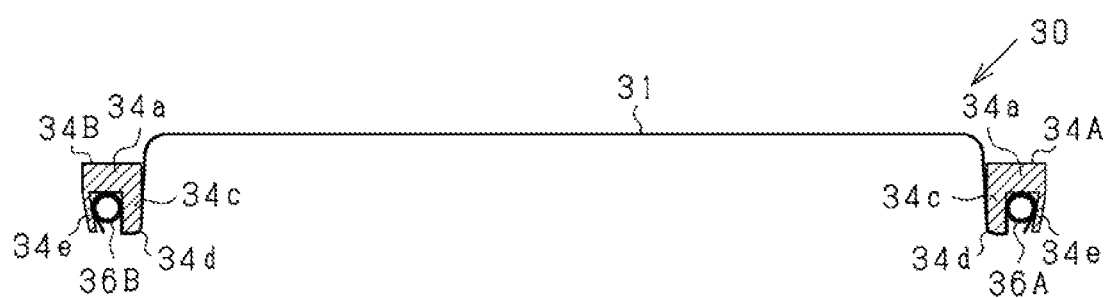
FIG. 9 is a cross-sectional view of the mesh assembly.

Next, with reference to FIGS. 7 to 9, the structure of the mesh assembly 30 will be described in detail. FIG. 7 is a perspective view of the mesh assembly 30, FIG. 8 is a cross-sectional view of a holder, and FIG. 9 is a cross-sectional view of the mesh assembly 30.

The mesh assembly 30 (a mesh-like body assembly) includes the mesh 31, the mesh band 32, the blocking member 33, a first holder 34A, a second holder 34B, a first holding member 36A, a second holding member 36B, and cover bolts 35A and 35B. The structure of each of the mesh 31, the mesh band 32, and the blocking member 33 is as described above.

Each of the holders 34A and 34B is formed into a groove-like shape, and includes a web 34a, a first flange 34c, and a second flange 34e. The web 34a is formed in a plate-like shape. The flanges 34c and 34e protrude from both widthwise end portions of the web 34a in a direction perpendicular to the web 34a. The thickness of the first flange 34c is set to be larger than that of the second flange 34e, and the strength of the first flange 34c is set to be higher than that of the second flange 34e. At an end portion in the direction of protrusion of the first flange 34c, a curved surface 34d is formed on an outer surface of the first flange 34c on the side opposite to the side of the second flange 34e. The curved surface 34d connects the side surface and the lower surface of the first flange 34c smoothly. Screw holes (first screw holes, second screw holes) 34b are formed in both longitudinal end portions (a plurality of portions) of the web 34a.

The holding members 36A and 36B are formed in a circular tube shape. The outer diameter of each of the holding members 36A and 36B is set to be slightly smaller than the width of the groove of each of the holders 34A and 34B. The length of each of the holding members 36A and 36B is substantially equal to the longitudinal length of each of the flanges 34c and 34e. That is, the size of each of the holding members 36A and 36B allows insertion of each of the holding members 36A and 36B into the groove of each of the holders 34A and 34B.

Each of the cover bolts 35A and 35B includes a head portion 35a, a shaft portion 35b, and a screw portion 35c. The shaft portion 35b connects the head portion 35a and the screw portion 35c. The diameter of the shaft portion 35b is smaller than that of the screw portion 35c. The screw portion 35c is capable of being screwed into the screw hole 34b of the web 34a and the screw hole 18 formed in the groove 23 of the first housing 11.

The mesh assembly 30 is assembled in the following manner.

The mesh band 32 to which the blocking member 33 is attached is placed on the mesh 31. With the mesh band 32 being placed on the mesh 31, one of both longitudinal end portions of the mesh 31 (outer edge portions of the mesh 31 that oppose each other) is inserted into the groove of the first holder 34A together with the first holding member 36A, and the other end portion of the mesh 31 is inserted into the groove of the second holder 34B together with the second holding member 36B. That is, the first holding member 36A and the second holding member 36B are disposed along the groove of the first holder 34A and the groove of the second holder 34B respectively.

The first flange 34c and the second flange 34e are swaged together such that the width of the groove of each of the holders 34A and 34B is reduced. At this point, the second flange 34e having the strength lower than that of the first flange 34c is mainly deformed, and each of the holding members 36A and 36B is fixed by the first flange 34c and the second flange 34e. With this, both longitudinal end portions of the mesh 31 are respectively held between the inner surface of the groove of the first holder 34A and the outer peripheral surface of the first holding member 36A, and between the inner surface of the groove of the second holder 34B and the outer peripheral surface of the second holding member 36B. The first holder 34A and the second holder 34B are attached to the outer edge portions of the mesh 31 (the short sides of the mesh 31) that oppose each other over the entire lengths of the outer edge portions.

Accordingly, it is possible to fix the mesh 31 and the mesh band 32 using curved surfaces instead of points or acute-angled portions, and prevent damage to the mesh 31 and the mesh band 32 in portions where the longitudinal end portions of the mesh 31 are fixed. Further, the first holding member 36A and the second holding member 36B are hollow, and hence it is possible to generate repulsion against pressing by the flanges 34c and 34e. Consequently, it is possible to resiliently support the mesh 31 and the mesh band 32 to prevent the mesh 31 and the mesh band 32 from being detached from the holders 34A and 34B.

The cover bolts 35A (first fixing members) are screwed into the two screw holes 34b of the first holder 34A. In addition, the cover bolts 35B (second fixing members) are screwed into the two screw holes 34b of the second holder 34B. That is, the cover bolts 35A and 35B are attached to both end portions (a plurality of portions) of the first holder 34A and the second holder 34B respectively. With this, the shaft portions 35b of the cover bolts 35A and 35B are inserted into the screw holes 34b. Accordingly, it is possible to prevent the cover bolts 35A and 35B from being detached from the mesh assembly 30.

Figure 10:
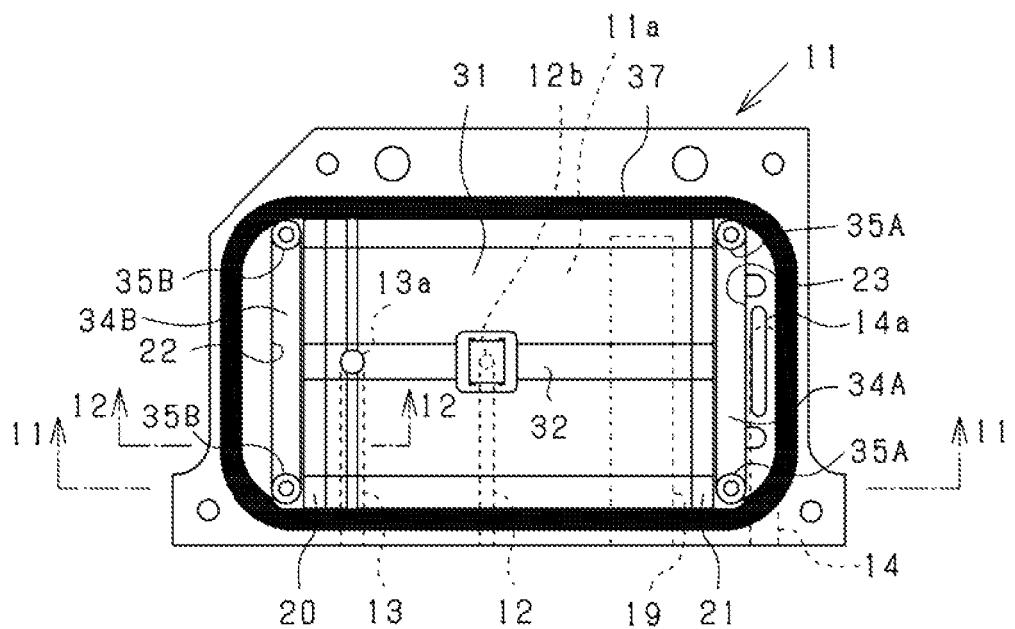
FIG. 10 is a plan view of the first housing and the mesh assembly.
Figure 11:
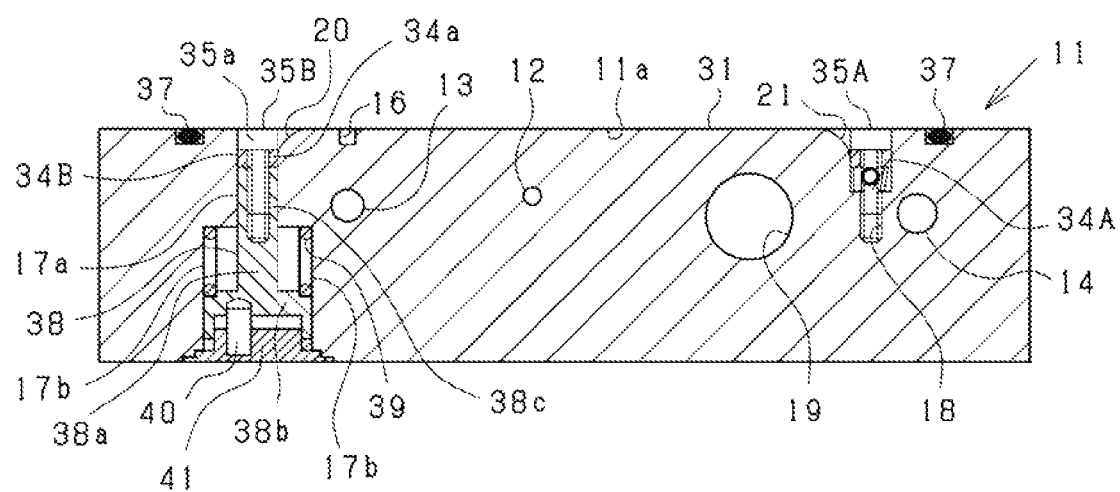
FIG. 11 is a cross-sectional view taken along the line 11-11 of FIG. 10.
Figure 12:
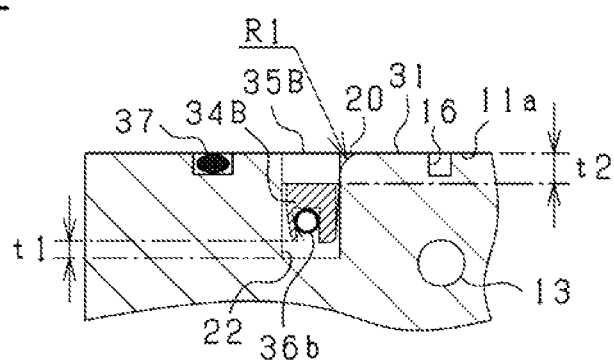
FIG. 12 is a cross-sectional view taken along the line 12-12 of FIG. 10.

Next, with reference to FIGS. 10 to 12, the assembly of the mesh assembly 30 to the first housing 11 will be described. FIG. 10 is a plan view of the first housing 11 and the mesh assembly 30, FIG. 11 is a cross-sectional view taken along the line 11-11 of FIG. 10, and FIG. 12 is a cross-sectional view taken along the line 12-12 of FIG. 10.

Stems 38 are inserted into the holes 17a and 17b of the first housing 11. Each of the stems 38 (a moving member) includes a cylindrical shaft portion 38a and a disk-like flange portion 38b. Axes of the shaft portion 38a and the flange portion 38b match with each other. The shaft portion 38a is supported by the inner peripheral surface of the hole 17a so as to be movable in an axial direction. The flange portion 38b is supported by the inner peripheral surface of the hole 17b so as to be movable in the axial direction. With this, the stem 38 is supported by the first housing 11 so as to be movable along a direction perpendicular to the liquid-supplied surface 11a (a specific direction inclined with respect to the liquid-supplied surface 11a). Accordingly, it is possible to efficiently provide the disposition space of the stem 38 in the first housing 11 to prevent an increase in the size of the first housing 11.

A screw hole 38c is formed in the upper end portion of the shaft portion 38a (the end portion on the side opposite to the side of the flange portion 38b). The screw hole 38c is capable of tightening the screw portions 35c of the cover bolts 35B.

A sealing member 41 for sealing the hole 17b is attached to the lower side of the stem 38 (on the side opposite to the side of the liquid-supplied surface 11a). In the hole 17b, a coil spring 39 is provided on the upper side of the flange portion 38b (on the side of the liquid-supplied surface 11a). The coil spring 39 (a biasing member) biases the stem 38 toward the lower side (the side away from the liquid-supplied surface 11a). In a state where the cover volt 35B is not screwed into the screw hole 38c of the shaft portion 38a, the stem 38 is brought into contact with the sealing member 41 by the biasing force of the coil spring 39. The stem 38 is prevented from rotating by a pin 40 (an anti-rotation member). Accordingly, the stem 38 is movable in the axial direction while the rotation thereof about its axis is restricted.

The holders 34A and 34B of the mesh assembly 30 are inserted into the grooves 22 and 23 of the first housing 11, respectively. The mesh 31 and the mesh band 32 cover the liquid-supplied surface 11a. The mesh 31 and the mesh band 32 are placed over the curved surface 21 between the liquid-supplied surface 11a and the screw holes 18 of the first housing 11. In addition, the mesh 31 and the mesh band 32 are placed over the curved surface 20 between the liquid-supplied surface 11a and the stems 38.

Both end portions of the first holder 34A are fixed to the first housing 11 by screwing the cover bolts 35A into the screw holes 18 from the upper side (the side of the liquid-supplied surface 11a). That is, both end portions of the first holder 34A (a plurality of portions) are fixed to the first housing 11, and one side of the mesh 31 is thereby fixed over the entire length thereof via the first holder 34A. Accordingly, the mesh 31 and the mesh band 32 extend downward (the direction perpendicular to the liquid-supplied surface 11a) along the curved surface 21 from the liquid-supplied surface 11a. As shown in FIG. 9, the mesh 31 and the mesh band 32 are guided into the groove of the first holder 34A along the curved surface 34d formed on the first flange 34c of the first holder 34A.

Returning to FIGS. 10 to 12, both end portions of the second holder 34B are fixed to the stems 38 by screwing the cover bolts 35B into the screw holes 38c of the stems 38 from the upper side (the side of the liquid-supplied surface 11a). Accordingly, the mesh 31 and the mesh band 32 extend downward (the direction perpendicular to the liquid-supplied surface 11a) along the curved surface 20 from the liquid-supplied surface 11a. As shown in FIG. 9, the mesh 31 and the mesh band 32 are guided into the groove of the second holder 34B along the curved surface 34d formed on the first flange 34c of the second holder 34B.

Returning to FIGS. 10 to 12, when the cover bolt 35B of the second holder 34B is screwed into the screw hole 38c of the stem 38, the distance between the second holder 34B and the stem 38 is reduced, and the stem 38 is moved upward (the direction toward the second holder 34B). Accordingly, the second holder 34B is biased downward (the direction away from the liquid-supplied surface 11a) via the stem 38 and the cover bolt 35B by the biasing force of the coil spring 39. As shown in FIG. 11, the cover bolt 35B is screwed until the head portion 35a of the cover bolt 35B and the web 34a of the second holder 34B are brought into contact with each other. And the web 34a of the second holder 34B and the shaft portion 38a of the stem 38 are brought into contact with each other. At this point, as shown in FIG. 12, a gap t1 is formed between the bottom surface of the groove 22 and the second holder 34B. That is, the biasing force by the coil spring 39 is balanced with the tension of the mesh 31 (specifically, inclusive of the mesh band 32). Further, even when the mesh 31 is stretched within the range of the gap t1 mentioned above due to the use or the like, it is possible to absorb the stretch using the coil spring 39 to prevent the intimate contact between the liquid-supplied surface 11a and the mesh 31 from being weakened.

Consequently, the second holder 34B is biased downward in the state where the first holder 34A is fixed, and it is possible to maintain a state where the tension acts on the mesh 31 and the mesh band 32 to thereby prevent the looseness of the mesh 31 and the mesh band 32. Further, the tension acts on both longitudinal end portions of the mesh 31 (the outer edge portions that oppose each other) via the holders 34A and 34B, and hence it is possible to bring the mesh 31 into intimate contact with the liquid-supplied surface 11a uniformly.

Moreover, in a case where the mesh 31 is properly fixed by the holders 34A and 34B, a distance t2 between the liquid-supplied surface 11a and the upper surface of the second holder 34B is set to be slightly longer than a radius of curvature R1 of the curved surface 20. Accordingly, even in a case where the distance between the first holder 34A and the second holder 34B is reduced due to an installation error or the like, or the mesh 31 contracts due to some cause, it is possible to place the mesh 31 over the entire curved surface 20.

In addition, the mesh 31 and the mesh band 32 coupled to the stems 38 via the second holder 34B are smoothly pulled downward along the curved surface 20. At this point, the entire surface including the liquid-supplied surface 11a and the curved surfaces 20 and 21 is formed into a smooth surface, and hence the friction between the liquid-supplied surface 11a or the curved surfaces 20 and 21, and the mesh 31 is reduced. Further, both end portions (a plurality of portions) of the second holder 34B are fixed to the two stems 38, and one side of the mesh 31 is thereby pulled over the entire length of the side via the second holder 34B. Accordingly, it is possible to bring the mesh 31 and the mesh band 32 into intimate contact with the liquid-supplied surface 11a stably.

The present embodiment thus described in detail has the following advantages.

It is possible to maintain the state where the tension acts on the mesh 31 to thereby prevent the looseness of the mesh 31. Further, since the tension acts on the outer edge portions of the mesh 31 that oppose each other via the first holder 34A and the second holder 34B, it is possible to bring the mesh 31 into intimate contact with the liquid-supplied surface 11a uniformly. Consequently, it is possible to uniformly spread the chemical solution supplied to the liquid-supplied surface 11a along the liquid-supplied surface 11a by the interfacial tension at an interface between the liquid-supplied surface 11a and the mesh 31. As a result, it is possible to stably vaporize the chemical solution on the liquid-supplied surface 11a when the liquid-supplied surface 11a is heated by the heater 70.

It is possible to perform fixing of the mesh 31 and the mesh band 32 to the first housing 11, bringing of the mesh 31 and the mesh band 32 into intimate contact with the liquid-supplied surface 11a, and sealing of the space around the liquid-supplied surface 11a from the upper side. Consequently, it is possible to improve the workability in attaching and detaching the mesh 31 and the mesh band 32 to and from the first housing 11. Further, it is possible to easily clean the liquid-supplied surface 11a with the mesh assembly 30 being detached.

The coil spring 39 is used as the biasing member for biasing the stem 38. Consequently, it is possible to stably bias the stem 38, and hence it is possible to properly adjust the force for bringing the mesh 31 into intimate contact with the liquid-supplied surface 11a, and by extension stabilize performance in vaporizing the chemical solution. Further, even when the mesh 31 is stretched due to the use, it is possible to absorb the stretch using the coil spring 39 to prevent the intimate contact between the liquid-supplied surface 11a and the mesh 31 from being weakened.

The mesh 31 coupled to the stems 38 via the second holder 34B is smoothly pulled downward along the curved surface 20. Accordingly, it is possible to bring the mesh 31 into intimate contact with the liquid-supplied surface 11a stably while fixing the second holder 34B to the stems 38 using the cover bolts 35B from the side of the liquid-supplied surface 11a.

It is possible to fix a plurality of portions of the first holder 34A to the first housing 11 to prevent the rotation of the first holder 34A, and fix one side of the mesh 31 over the entire length of the side via the first holder 34A. In addition, it is possible to fix a plurality of portions of the second holder 34B to the stems 38 to prevent the rotation of the second holder 34B, and pull one side of the mesh 31 over the entire length of the side via the second holder 34B. Consequently, it is possible to bring the entire mesh 31 into intimate contact with the liquid-supplied surface 11a uniformly.

It is possible to fix both end portions of the first holder 34A to the first housing 11 and stabilize them, and fix one side of the mesh 31 over the entire length of the side via the first holder 34A more reliably. In addition, it is possible to fix both end portions of the second holder 34B to the stems 38 and stabilize them, and pull one side of the mesh 31 over the entire length of the side via the second holder 34B more reliably.

The mesh assembly 30 can be treated as one element including the mesh 31, the first and second holders 34A and 34B, and the cover bolts 35A and 35B, and hence it is possible to facilitate the assembly of the liquid vaporizer 10.

It is possible to fix the mesh 31 using the curved surfaces 34d of the holding members 36A and 36B instead of points or acute-angled portions. Accordingly, it is possible to prevent damage to the mesh 31 in the portions where the holders 34A and 34B are attached to the mesh 31. Further, since the holding members 36A and 36B are in a circular tube shape, i.e., hollow, it is possible to resiliently support the mesh 31. Consequently, it is possible to prevent the mesh 31 from being detached from the holder.

The shaft portion 35b of the cover bolt 35A is inserted into the screw hole 34b of the first holder 34A, and the shaft portion 35b of the cover bolt 35B is inserted into the screw hole 34b of the second holder 34B. Accordingly, when the mesh assembly 30 is assembled to the liquid vaporizer 10, it is possible to prevent the cover bolts 35A and 35B from being detached from the mesh assembly 30. As a result, it is possible to prevent the cover bolts 35A and 35B from getting lost in the internal portion of the liquid vaporizer 10.

In the portion of the mesh band 32 in contact with the mesh 31, it is possible to spread the chemical solution also between the mesh 31 and the mesh band 32 by the interfacial tension. Accordingly, the spreading of the chemical solution can be more facilitated in the portion provided with the mesh band 32 than in the other portions. As a result, it is possible to spread the chemical solution preferentially in a desired direction by adjusting the disposition of the mesh band 32. Further, since the mesh band 32 is formed by being woven in a mesh pattern, it is possible to facilitate the vaporization of the chemical solution via the mesh band 32 as compared with the case where the mesh band 32 is formed in the plate-like shape or the film-like shape.

In the portion of the blocking member 33 formed in the plate-like shape or the film-like shape, it is possible to prevent the chemical solution from passing through the blocking member 33. Accordingly, it is possible to prevent the supplied chemical solution from passing through the mesh 31 and the mesh band 32 and jetting out by disposing the blocking member 33 around the supply opening 12b of the chemical solution.

Note that the embodiment described above can also be implemented by modifying the embodiment in the following manner. The description of the same members as those in the above embodiment will be omitted by retaining the same reference numerals.

Figure 13:
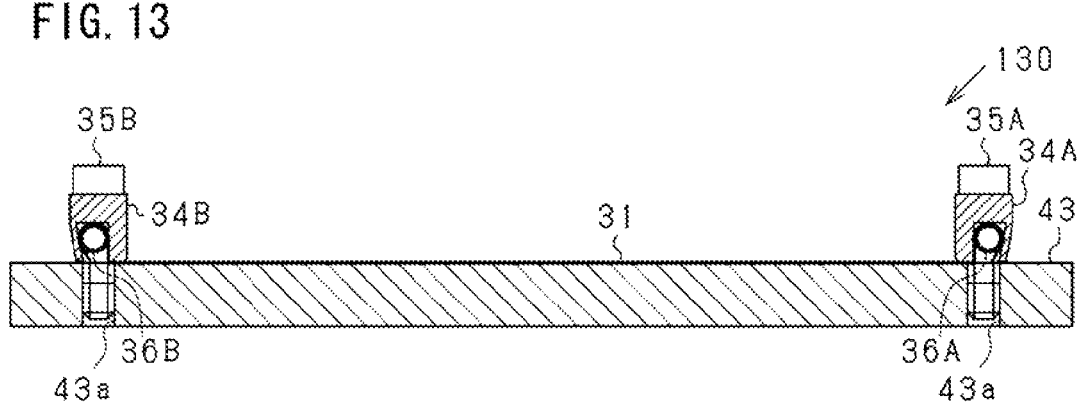
FIG. 13 is a cross-sectional view showing a modification of the mesh assembly.

As shown in FIG. 13, a mesh assembly 130 may include a transport member 43. The transport member 43 is formed in a rectangular shape, and screw holes 43a (engaging portions) are formed at positions corresponding to the cover bolts 35A and 35B in a state where the mesh 31 is spread. The cover bolts 35A and 35B are screwed into (engaged with) the screw holes 43a of the transport member 43, and the holders 34A and 35B are thereby fixed to the transporting member 43. According to such a structure, it is possible to maintain the state where the mesh 31 is spread. Consequently, it is possible to prevent the mesh 31 from being bent or wrinkled during the transport of the mesh assembly 130 or the like. Note that, instead of the plate-like transport member 43, it is also possible to use the transport member formed in a frame-like shape except the portions formed with the screw holes 43a. In addition, the mesh assembly 130 having the transport member 43 may be packed in its clean state and used as a maintenance part.

Figure 14:
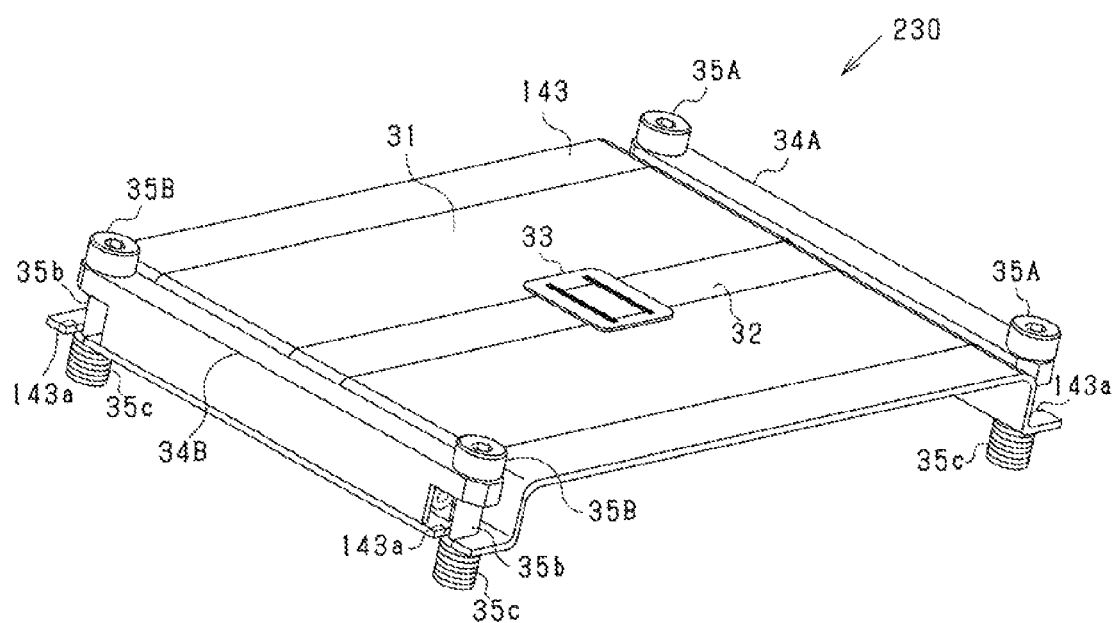
FIG. 14 is a cross-sectional view showing another modification of the mesh assembly.

Further, as shown in FIG. 14, a mesh assembly 230 may include a gutter-like transport member 143. The transport member 143 is formed in the gutter-like shape, and notches 143a (engaging portions) are formed at positions corresponding to the cover bolts 35A and 35B in the state where the mesh 31 is spread. Specifically, the shape of the transport member 143 is set such that the mesh 31 is brought into a state where the mesh 31 is spread along the liquid-supplied surface 11a and curved surfaces 20 and 21. The shaft portions 35b of the cover bolts 35A and 35B are fitted in (engaged with) the notches 143a of the transport member 143, and the holders 34A and 34B are thereby fixed to the transport member 143. According to such a structure, it is possible to achieve the same functions and effects as those of the transport member 43 of FIG. 13. Further, while there is a possibility, in the case of the transport member 43, that wear debris is generated when the cover bolts 35A and 35B are screwed into the screw holes 34b, the transport member 143 has the structure in which the cover bolts 35A and 35B are fitted in the notches 143a so that it is possible to prevent the generation of the wear debris. As a result, it is possible to prevent the wear debris from being mixed into a package when the mesh assembly 230 is packed in its clean state.

Although the mesh 31 is fixed to the holders 34A and 34B using the holding members 36A and 36B in the embodiment described above, the mesh 31 can also be fixed to the holders 34A and 34B by welding.

The first holder 34A and the second holder 34B are attached to both longitudinal end portions of the mesh 31 in the embodiment described above, and a third holder and a fourth holder can also be attached to both lateral end portions of the mesh 31. Further, a structure can also be adopted in which the third holder is fixed to the first housing 11 similarly to the first holder 34A, and the fourth holder is fixed to the stems 38 similarly to the second holder 34B.

It is possible to provide the cover bolts 35A at positions closer to the center of the first holder 34A than both end portion of the first holder 34A, and provide the cover bolts 35B at positions closer to the center of the second holder 34B than both end portion of the second holder 34B.

Instead of the curved surfaces 20 and 21 of the first housing 11, it is also possible to use bent surfaces that bends in a stepwise manner from the liquid-supplied surface 11a toward a specific direction inclined with respect to the liquid-supplied surface 11a. In addition, the specific direction inclined with respect to the liquid-supplied surface 11a is not limited to the direction perpendicular to the liquid-supplied surface 11a, and it is also possible to adopt a direction slightly inclined with respect to the direction perpendicular to the liquid-supplied surface 11a.

Instead of the cover bolt 35, it is also possible to use a normal bolt.

The biasing member for biasing the stem 38 is not limited to the coil spring 39, and it is also possible to use a plate spring and elastic rubber.

The weave method for the mesh 31 and the mesh band 32 is not limited to plain weave, but it is also possible to adopt other weave methods such as twill weave and the like. In addition, it is desirable to properly set the roughness of the mesh 31 or the mesh band 32 within the range of about 100 to 500 mesh according to the wettability of the chemical solution to the mesh 31 or the mesh band 32, the wettability of the chemical solution to the liquid-supplied surface 11a, and the viscosity of the chemical solution.

The shape of the liquid-supplied surface 11a is not limited to the rectangular shape, and the liquid-supplied surface 11a can have other polygonal shapes or a circular shape. In this case, the shape of the mesh 31 may be set in correspondence to the shape of the liquid-supplied surface 11a.

Although the mesh band 32 is woven in a mesh pattern in the embodiment described above, it is also possible to form the mesh band 32 in the film-like shape. In this case, the band formed in the film-like shape fulfills the function of the blocking member 33, and hence the blocking member 33 may be omitted. In addition, also in a case where the supply pressure of the chemical solution is low so that there is a low possibility that the chemical solution passes through the mesh 31 and the mesh band 32 and jets out, the blocking member 33 may be omitted. Further, the mesh band 32 can also be omitted.

The chemical solution is not limited to the hydrophobizing solution (HMDS), and it is also possible to use other chemical solutions such as a thinner-based solvent and a silane coupling agent. In this case, it is desirable to change the material for the mesh 31 or the mesh band 32 according to the wettability to the chemical solution. As the material therefor, it is possible to use, e.g., metals other than the stainless material, and resins.

What is claimed is:
1. A liquid control device for controlling spreading and vaporization of a liquid, comprising:
    a main body having a liquid-supplied surface to which the liquid is supplied;
    a heater configured to heat the liquid-supplied surface;
    a mesh-like body woven in a mesh pattern;
    a first holder and a second holder respectively attached to outer edge portions of the mesh-like body, the outer edge portions opposing each other in a direction of spreading of the mesh-like body;
    a first fixing member fixing the first holder to the main body from a side of the liquid-supplied surface;
    a moving member supported by the main body so as to be movable along a specific direction inclined with respect to the liquid-supplied surface;
    a second fixing member fixing the second holder to the moving member from the side of the liquid-supplied surface;
    a biasing member biasing the moving member along the specific direction to bring the mesh-like body into intimate contact with the liquid-supplied surface; and
    a lid member covering the mesh-like body from the side of the liquid-supplied surface to seal a space around the liquid-supplied surface with the main body.

2. The liquid control device according to claim 1, wherein the biasing member is a coil spring.

3. The liquid control device according to claim 1, wherein
the main body is formed with a curved surface gradually inclined from the liquid-supplied surface toward the specific direction, and
the mesh-like body is placed over the curved surface between the liquid-supplied surface and the moving member.

4. The liquid control device according to claim 1, wherein the specific direction is a direction perpendicular to the liquid-supplied surface.

5. The liquid control device according to claim 1, wherein
the mesh-like body is formed in a rectangular shape,
the first holder and the second holder are respectively attached to the outer edge portions of the mesh-like body over entire lengths of the outer edge portions,
the first fixing member is provided at each of a plurality of portions of the first holder, and
the second fixing member is provided at each of a plurality of portions of the second holder.

6. The liquid control device according to claim 5, wherein
the first fixing member is provided at each of both end portions of the first holder, and
the second fixing member is provided at each of both end portions of the second holder.

7. The liquid control device according to claim 1, wherein
the first fixing member fixes the first holder to the main body from an upper side,
the second fixing member fixes the second holder to the moving member from the upper side, and
the lid member covers the mesh-like body from the upper side.

8. A mesh-like body assembly applied to a liquid control device for controlling spreading and vaporization of a liquid, comprising:
a mesh-like body woven in a mesh pattern and formed in a rectangular shape;
a first holder and a second holder respectively attached to outer edge portions of the mesh-like body over entire lengths of the outer edge portions, the outer edge portions opposing each other;
a first fixing member attached to each of a plurality of portions of the first holder from a specific side and used to fix the first holder to the liquid control device; and
a second fixing member attached to each of a plurality of portions of the second holder from the specific side and used to fix the second holder to the liquid control device.

9. The mesh-like body assembly according to claim 8, further comprising:
a first holding member formed in a circular tube shape and disposed along the first holder; and
a second holding member formed in a circular tube shape and disposed along the second holder, wherein
the outer edge portions of the mesh-like body are respectively held between a part of the first holder and an outer peripheral surface of the first holding member, and between a part of the second holder and an outer peripheral surface of the second holding member.

10. The mesh-like body assembly according to claim 8, wherein
each of the first fixing member and the second fixing member is a cover bolt including a head portion, a screw portion, and a shaft portion connecting the head portion and the screw portion,
a first screw hole is formed at each of a plurality of portions of the first holder,
a second screw hole is formed at each of a plurality of portions of the second holder,
the shaft portion of the first fixing member is inserted into the first screw hole of the first holder, and
the shaft portion of the second fixing member is inserted into the second screw hole of the second holder.

11. The mesh-like body assembly according to claim 10, further comprising a transport member, wherein
the transport member is formed with engaging portions engageable with the cover bolts at positions corresponding to the cover bolts in a state where the mesh-like body is spread, and
the cover bolts are engaged with the engaging portions of the transport member.

12. The mesh-like body assembly according to claim 8, further comprising a guiding member woven in a mesh pattern and in contact with the mesh-like body.

13. The mesh-like body assembly according to claim 12, further comprising a blocking member formed in a plate-like shape or a film-like shape and covering a part of the guiding member.

14. The liquid control device according to claim 2, wherein
the main body is formed with a curved surface gradually inclined from the liquid-supplied surface toward the specific direction, and
the mesh-like body is placed over the curved surface between the liquid-supplied surface and the moving member.

15. The liquid control device according to claim 2, wherein the specific direction is a direction perpendicular to the liquid-supplied surface.

16. The liquid control device according to claim 2, wherein
the mesh-like body is formed in a rectangular shape,
the first holder and the second holder are respectively attached to the outer edge portions of the mesh-like body over entire lengths of the outer edge portions,
the first fixing member is provided at each of a plurality of portions of the first holder, and
the second fixing member is provided at each of a plurality of portions of the second holder.

17. The liquid control device according to claim 2, wherein
the first fixing member fixes the first holder to the main body from an upper side,
the second fixing member fixes the second holder to the moving member from the upper side, and
the lid member covers the mesh-like body from the upper side.

18. The mesh-like body assembly according to claim 9, wherein
each of the first fixing member and the second fixing member is a cover bolt including a head portion, a screw portion, and a shaft portion connecting the head portion and the screw portion,
a first screw hole is formed at each of a plurality of portions of the first holder,
a second screw hole is formed at each of a plurality of portions of the second holder,
the shaft portion of the first fixing member is inserted into the first screw hole of the first holder, and
the shaft portion of the second fixing member is inserted into the second screw hole of the second holder.

19. The mesh-like body assembly according to claim 9, further comprising a guiding member woven in a mesh pattern and in contact with the mesh-like body.

* * * * *